US007850079B2

(12) United States Patent
Lovegreen et al.

(10) Patent No.: US 7,850,079 B2
(45) Date of Patent: Dec. 14, 2010

(54) MULTIFUNCTION CARD DISPENSER AND CUSTOMER INFORMATION COLLECTION DEVICE

(75) Inventors: Kenneth J. Lovegreen, Lake Kiowa, TX (US); Russell P. Blink, Rowlett, TX (US)

(73) Assignee: Long Range Systems, Inc., Addison, TX (US)

( * ) Notice: Subject to any disclaimer, the term of this patent is extended or adjusted under 35 U.S.C. 154(b) by 1042 days.

(21) Appl. No.: 11/588,072

(22) Filed: Oct. 26, 2006

(65) Prior Publication Data

US 2007/0040022 A1 Feb. 22, 2007

Related U.S. Application Data

(63) Continuation-in-part of application No. 10/961,461, filed on Oct. 8, 2004, now Pat. No. 7,128,261.

(51) Int. Cl.
*G06K 15/00* (2006.01)

(52) U.S. Cl. .................................... 235/383; 235/492

(58) Field of Classification Search ................. 235/383, 235/492, 485, 487
See application file for complete search history.

(56) References Cited

U.S. PATENT DOCUMENTS

| | | | |
|---|---|---|---|
| D254,944 S | 5/1980 | Lee et al. | |
| 4,882,675 A | 11/1989 | Nichtberger et al. | |
| D333,743 S | 3/1993 | Johnson | |
| 5,237,157 A | 8/1993 | Kaplan | |
| 5,288,565 A | 2/1994 | Gruenstern | |
| 5,355,115 A | 10/1994 | Goor et al. | |
| 5,513,117 A * | 4/1996 | Small | 700/233 |
| 5,587,560 A | 12/1996 | Crooks et al. | |
| 5,813,748 A | 9/1998 | Maxymych | |
| 5,814,968 A | 9/1998 | Lovegreen et al. | |
| 5,859,628 A | 1/1999 | Ross et al. | |
| 5,893,075 A | 4/1999 | Plainfield et al. | |
| 6,014,316 A | 1/2000 | Eide | |
| 6,076,079 A | 6/2000 | Boston et al. | |
| 6,310,783 B1 | 10/2001 | Winch et al. | |

(Continued)

FOREIGN PATENT DOCUMENTS

EP 1059599 12/2000

OTHER PUBLICATIONS

U.S. Appl. No. 10/961,461, Henderson et al.

(Continued)

*Primary Examiner*—Daniel St. Cyr
(74) *Attorney, Agent, or Firm*—Steven W. Smith

(57) ABSTRACT

A method and a computer-controlled, multi-function device for generating and dispensing retail cards such as gift cards and loyalty cards and for collecting customer survey information. The device includes a reader such as a magnetic strip reader for receiving payment for the gift card from the customer. A card inspector determines whether the gift card is electronically readable and if not, disposes the card in a bad card hopper. If the card is readable, the device dispenses the card to the customer. An electronic survey apparatus obtains customer information and stores it in an external server. The customer information may include customer responses to survey questions or customer contact information. An external interface enables survey questions to be automatically uploaded to the device and for responses and customer contact information to be downloaded from the device.

16 Claims, 9 Drawing Sheets

U.S. PATENT DOCUMENTS

| | | | | |
|---|---|---|---|---|
| 6,380,928 | B1 | 4/2002 | Todd | |
| 6,655,580 | B1 * | 12/2003 | Ergo et al. | 235/375 |
| 6,957,746 | B2 * | 10/2005 | Martin et al. | 221/131 |
| 6,960,988 | B2 | 11/2005 | Blink et al. | |
| 7,028,896 | B2 * | 4/2006 | Goldstein et al. | 235/436 |
| 2002/0107717 | A1 | 8/2002 | Liu et al. | |
| 2004/0099730 | A1 * | 5/2004 | Tuchler et al. | 235/380 |
| 2006/0085267 | A1 | 4/2006 | Lovegreen et al. | |
| 2007/0272743 | A1 * | 11/2007 | Christie et al. | 235/381 |

OTHER PUBLICATIONS

Hayes, Jack; "Freebies and Other Kid Friendly Frills"; Nation's Restaurant News, Jan. 15, 1996.

* cited by examiner

MULTIFUNCTION CARD DISPENSER AND CUSTOMER INFORMATION COLLECTION DEVICE

CROSS-REFERENCE TO RELATED APPLICATIONS

This application is a continuation-in-part of U.S. patent application Ser. No. 10/961,461 filed Oct. 8, 2004 now U.S. Pat. No. 7,128,261.

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND OF THE INVENTION

The present invention is related to automated retail systems. More particularly, and not by way of limitation, the present invention is directed to a computer-controlled, multi-function device for generating and dispensing cards such as gift cards and loyalty cards and for collecting customer information such as customer contact information and customer satisfaction information.

The issuance of gift certificates has long been a useful way for merchants to increase sales and for customers to provide gifts to other persons. The receiving persons can then redeem the certificates for desired goods and/or services at the merchants who issued the gift certificates. A drawback to this process has been the inconvenience of having to purchase the certificate at a point-of-sale (POS) terminal at the merchant's location. This process often involves waiting for a sales person to become available before the certificate can be purchased and recorded in the merchant's POS system.

U.S. Pat. No. 5,652,421 to Veeneman et al. discloses a method and apparatus for generating gift certificates, which provides a kiosk through which a customer may purchase a gift certificate with a credit card. The customer can choose a merchant and a gift certificate value, and the kiosk prints and dispenses the certificate, and notifies the merchant. However, Veeneman still has several shortcomings. First is the large size of the kiosk, which limits its mobility and the number of places where it can be installed. Second, merchants today desire to use plastic programmable gift cards, similar in appearance to credit cards, and Veeneman is only capable of printing paper certificates. Third, Veeneman does not perform any kind of inspection to validate whether the gift certificate printed correctly. Thus, problems may arise if the customer did not receive a properly printed certificate, but was charged for it anyway.

It would be advantageous to have a method and apparatus for generating and dispensing gift cards that overcomes the shortcomings of existing gift certificate systems. The present invention provides such a method and apparatus.

Merchants also find that it increases business to issue loyalty cards to their customers. By offering discounts to customers with loyalty cards, the customers are provided with incentive to return to the issuing merchant each time they shop. Currently, the task of issuing loyalty cards is largely manual. The customer must fill out a form with her personal information. An employee must enter this information into the merchant's point-of-sale (POS) system and link the information to the loyalty card issued to the customer. It would be advantageous to have a method and apparatus for generating and dispensing loyalty cards that overcomes the shortcomings of existing methods of issuing loyalty cards. The present invention provides such a method and apparatus.

It is also known in the art to utilize computer-based devices to collect customer information. For example, U.S. Pat. No. 5,893,075 to Plainfield et al. discloses a PC-based, interactive, programmable system that induces customers of a restaurant to enter information about themselves or to answer survey questions. The program is run on a PC, and the customer enters the information in data fields displayed on the PC's monitor. The Plainfield system is bulky, however, and is devoted to only this one task.

Likewise, U.S. Pat. No. 6,960,988 to Blink et al. discloses a multi-function customer satisfaction survey device that also functions as a restaurant tip tray and calculator. Survey questions are presented on a display screen, and a survey keypad is used by the customer to enter responses. The responses are stored in a memory in the tray. The trays stack on a base unit that simultaneously collects the responses from the stacked trays, simultaneously programs the stacked trays with survey questions, and simultaneously recharges a battery in each tray. The Blink device, however, is not appropriate for use in some restaurant settings such as fast-food restaurants, or in other retail business establishments where tip trays are not utilized.

What is needed is a multi-function device that overcomes the shortcomings of the prior art. The present invention provides such a device.

SUMMARY OF THE INVENTION

The present invention provides a computer-controlled, multi-function device for generating and dispensing cards such as gift cards and loyalty cards and for collecting customer information such as customer contact information and customer satisfaction information. By providing all of these functions in a single automated device, several advantages are realized. First, an automated device performs these functions more accurately and consistently than they can be performed manually. Second, an automated device performs these functions more efficiently because it does not require an employee to perform the functions. Third, combining the functions in a single device reduces the required "footprint" compared to two or three devices. Finally, having all of the functions concentrated in a single device produces a synergistic effect. Customers who began to use the device to purchase a gift card or loyalty card are then more likely to also answer a customer satisfaction survey. Likewise, customers who began to answer the customer satisfaction survey are more likely to also purchase a gift or loyalty card.

Thus, in one aspect, the present invention is directed to a computer-controlled, multi-function device for generating and dispensing a gift card and for collecting customer information, wherein the gift card has a financial value for purchasing goods and/or services from an associated merchant. The device includes payment input means for receiving payment for the gift card from the customer; dispensing means for dispensing the gift card to the customer in response to receiving the payment; and electronic means for obtaining and storing customer information. The customer information may include customer responses to survey questions or customer contact information.

In another aspect, the present invention is directed to a computer-controlled, multi-function device for generating and dispensing a gift certificate and for collecting customer information, wherein the gift certificate has a financial value for purchasing goods and/or services from an associated merchant. The device includes payment input means for receiving payment for the gift certificate from the customer; printing means for printing the gift certificate and dispensing the gift certificate to the customer in response to receiving the payment; and electronic means for obtaining and storing customer information.

In yet another aspect, the present invention is directed to a method of generating and dispensing a gift card and for collecting customer information in a retail establishment, wherein the gift card has a financial value for purchasing goods and/or services from an associated merchant. The method includes providing a multi-function device in a location in the retail establishment accessible by a customer; receiving payment for the gift card from the customer though the multi-function device; dispensing by the multi-function device, the gift card to the customer in response to receiving the payment; and obtaining and storing customer information in the multi-function device.

DETAILED DESCRIPTION OF EMBODIMENTS

Figure 1:
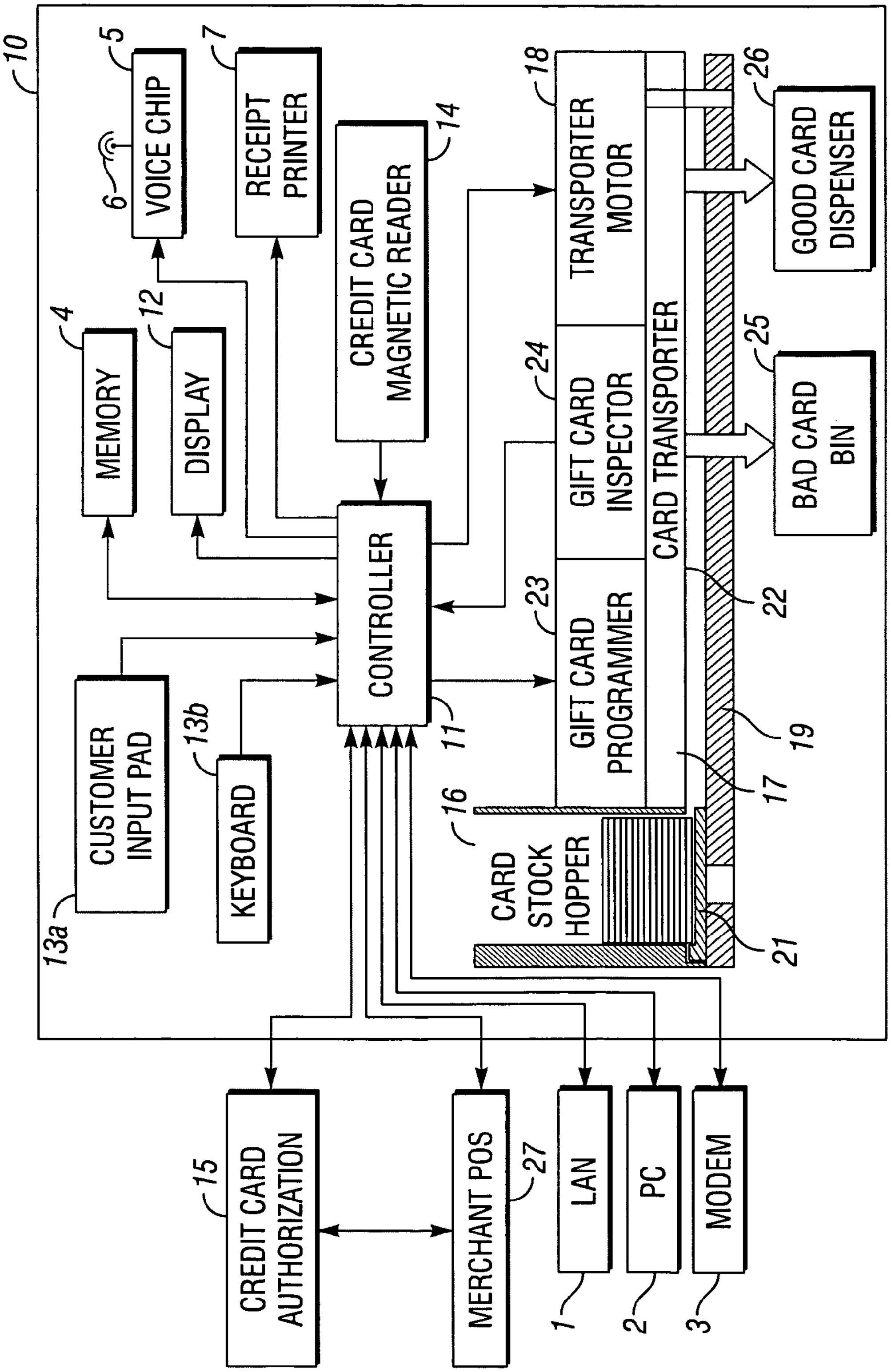
FIG. 1 is a simplified functional block diagram of an exemplary embodiment of the multi-function gift card dispenser and customer information collection device of the present invention.

FIG. 1 is a simplified functional block diagram of an exemplary embodiment of the multi-function card dispenser and customer information collection device 10 of the present invention. The description herein utilizes the purchase of a gift card as an example of the functioning of the invention. The invention, however, is applicable to the purchase or issuance of a wide variety of retail cards including, but not limited to, gift cards, loyalty cards, prepaid phone cards, and the like.

The device may be mounted on a wall, in a kiosk, or may be placed on a countertop within a merchant's retail establishment. A controller 11, such as a microcontroller or microprocessor, controls the gift card dispenser. In the exemplary embodiment, a customer receives information from the controller on a display 12, and inputs information related to the gift card on a customer input pad 13*a*, and inputs answers to survey questions through a pull-out keyboard 13*b*. When prompted by the controller, the customer makes payment for the gift card through, for example, a magnetic strip reader 14 for credit or debit cards. The controller obtains authorization for the purchase from a remote card authorization service 15. The magnetic strip reader may also read loyalty cards or club cards entitling the customer to a discounted price for the gift card, and/or charging the purchase to a special account. For example, the reader may read a "players' club" card issued by a casino. Purchases made with the players' club card may earn benefits for the customer. Payment may alternatively be made in the form of a radio frequency identifier (RFID) device, a smart card, an optical reader, and the like.

A card stock hopper 16 stores gift cards, which may be unprogrammed cards, cards preprogrammed with an identifier such as a serial number, or smart cards. The dispenser may program the unprogrammed cards at the time of purchase in any suitable manner, such as magnetically, electrically, optically, or mechanically. In a first embodiment, the gift card includes a magnetic strip for programming unprogrammed cards. Upon command of the controller 11, a card transporter 17 pulls a card from the card stock hopper. The card transporter includes a transporter motor 18 and a threaded shaft 19, which causes a card slide 21 (see FIG. 5) to pull a single card from the hopper and move it along a track 22.

In one embodiment, the transporter first moves the card past a gift card programmer 23, which programs the card with a gift amount and/or a customer identification. The customer identification may be obtained by the credit card reader 14, when the customer's credit card is read, or the customer may enter the identification using the customer input pad 13*a*. The card transporter then moves the card past a gift card inspector 24, which ensures that the card has been properly programmed. If the card inspector determines that the card was not properly programmed, the inspector notifies the controller 11, which causes the card transporter to drop the bad card into a bad card bin 25. If the card inspector determines that the card was properly programmed, the transporter continues to move the good card to the end of the track where the card falls into a good card dispenser 26. The controller then notifies the merchant's point-of-sale (POS) system 27 of the purchase amount of the gift card and the customer identification.

In one embodiment, the gift card programmer 23 programs the gift card with both the amount of the gift card and the customer identification. In an alternative embodiment, the gift card programmer programs the gift card with the customer identification only. The amount of the gift card is sent electronically from the controller 11 to the merchant's POS system 27.

For the customer survey functionality, the multi-function device 10 includes several connections 1-3 for uploading survey questions and downloading survey answers and other customer information from a memory 4. A LAN connection 1 such as a USB connection or an Ethernet connection connects the device to the merchant's LAN and to a controlling server (not shown). A PC connection such as an RS232 serial port 2 connects the device to a personal computer for uploading and downloading survey information. A modem 3 connects the device to a phone line for remotely uploading and downloading survey information.

The multi-function device 10 may also include a voice chip 5 for providing voice prompts to the customer through one or more speakers 6. The voice prompts may provide instructions, or may simply thank the customer for purchasing the gift card and/or taking the survey. For additional interest, the voice chip may synthesize or store recordings of one or more celebrity voices. As an added incentive to take the survey, the device may offer the customer a discount coupon for goods or services provided by the merchant. Alternatively, the device may offer the customer a discount on a gift card if the customer takes the survey.

At the end of a gift-card transaction, a receipt printer 7 prints a receipt for the customer. In one embodiment, the printer may also be used to print gift certificates instead of dispensing a gift card. If the customer performs the survey or enters other customer information such as an electronic mail (e-mail) address or other contact information, the printer may print a thank-you note or a discount coupon for goods or services provided by the merchant.

Figure 2:
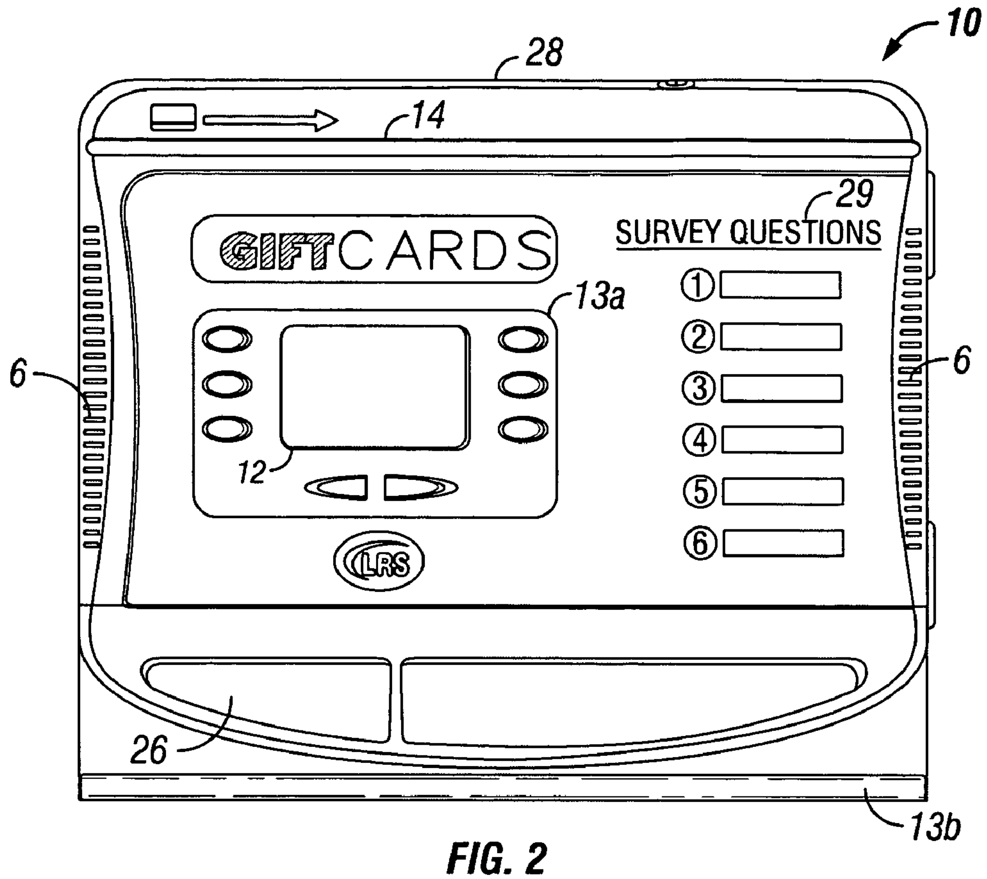
FIG. 2 is an illustrative drawing of a front panel of an exemplary embodiment of the gift card dispenser of the present invention.

FIG. 2 is an illustrative drawing of a front panel 28 of an exemplary embodiment of the multi-function device 10 of the present invention. The panel includes the receipt printer 7, the display 12, the customer input pad 13*a*, the pull-out keyboard 13*b*, the credit card reader 14, the good card dispenser 26, and a list of survey questions 29.

Figure 3:
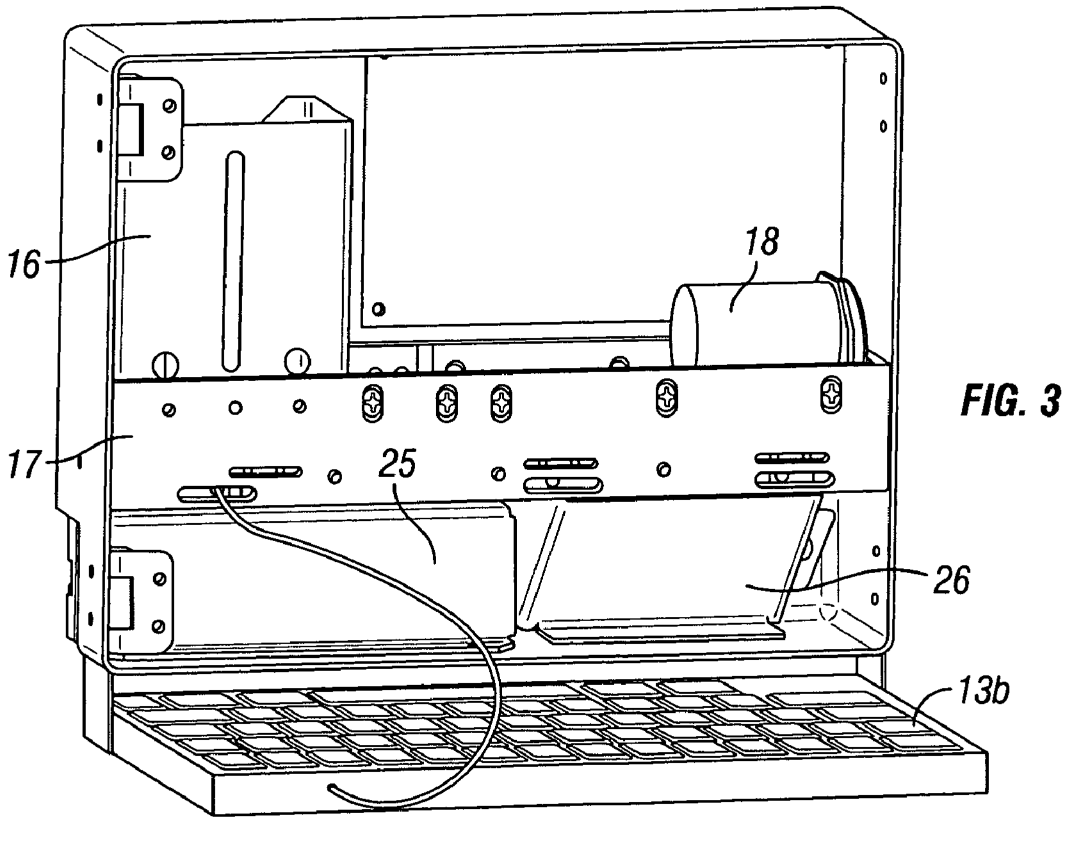
FIG. 3 is a rear-side perspective view of the gift card dispenser of the present invention, with a rear panel removed to show selected internal components.

FIG. 3 is a rear-side perspective view of the multi-function device 10 of the present invention, with a rear panel removed to show selected internal components. The components illustrated include the pull-out keyboard 13*b*, the card stock hopper 16, the card transporter 17, the transporter motor 18, the bad card bin 25, and the good card dispenser 26. It should be noted that the device may be implemented with multiple card stock hoppers. When mounted adjacent to each other, the device first empties the card stock hopper closest to the dispenser 26, and then pulls cards from the next hopper. When the card slide 21 moves under the closest card stock hopper and there are no cards present, the slide moves under the next hopper, where the slide engages a card and pulls it from the hopper.

Figure 4:
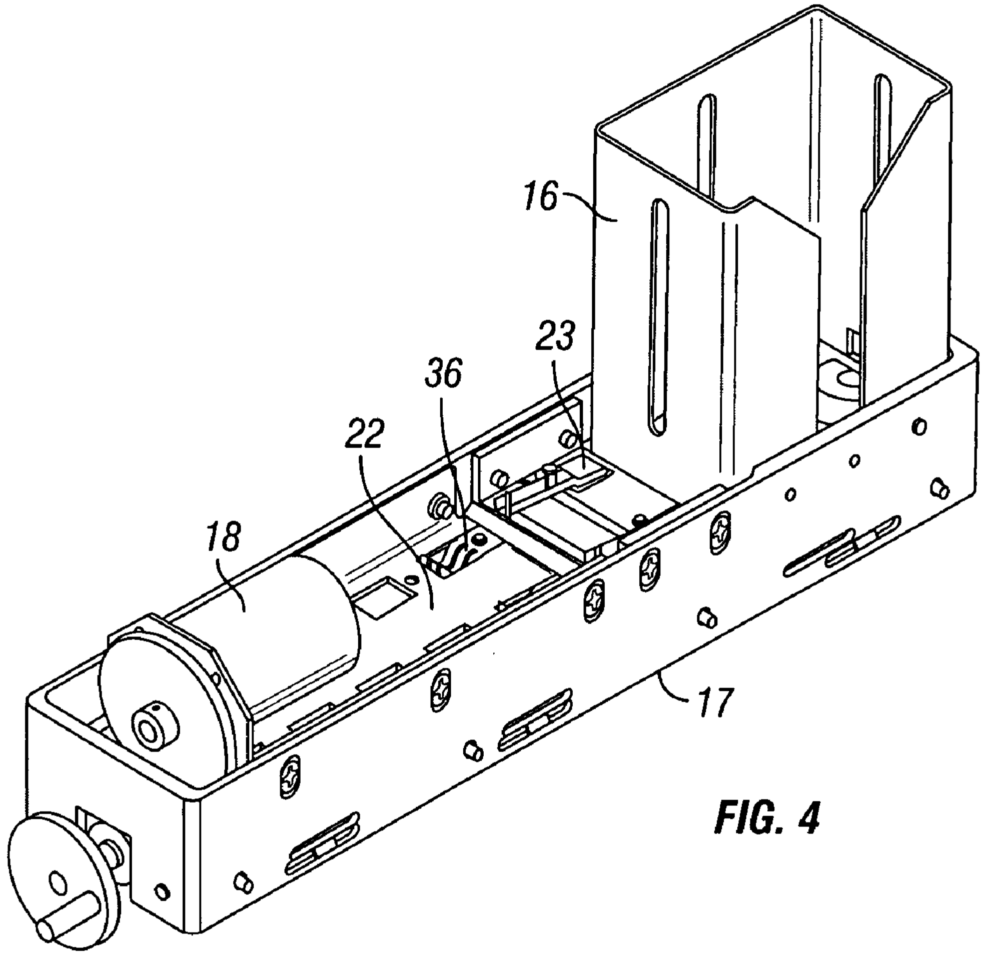
FIG. 4 is a front-side perspective view of a gift card transporter in an exemplary embodiment of the gift card dispenser of the present invention.
Figure 5:
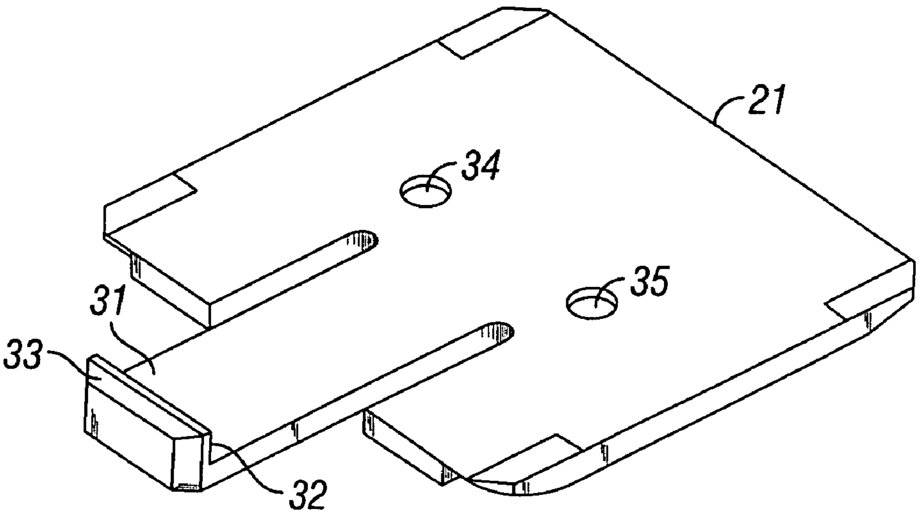
FIG. 5 is a perspective view of a card slide in an exemplary embodiment of the gift card dispenser of the present invention.

FIG. 4 is a front-side perspective view of the gift card transporter 17 in an exemplary embodiment of the multi-function device 10 of the present invention. In operation, the transporter removes a gift card from the card stock hopper 16 using the card slide 21, as shown in FIG. 5. Referring briefly to FIG. 5, the card slide includes a flexible extension 31 with a lip 32. The lip has a height sufficient to engage a single gift card when the slide is moved under the card stock hopper. A rear side of the lip is beveled, so that when the slide is moved under the hopper, the bevel causes the flexible extension 31 to flex slightly, allowing the slide to move under the bottommost card in the hopper. In addition, the entire stack of cards in the hopper is jostled upward slightly, which reduces the tendency of cards to stick together. When the card slide is moved completely under the hopper, the flexible extension returns to its unflexed position, and the lip 32 engages the bottommost card. Two holes 34, 35 in the card slide are used to mount the card slide to a threaded slider 41, which moves longitudinally along the bottom of the track 22 when the transporter motor 18 rotates the threaded shaft 19.

Referring again to FIG. 4, a number of springs 36 are mounted along the length of the track, and press the gift card onto the card slide as the slide moves along the track. A series of small detents in the track prevent the card from moving in reverse (i.e., the card cannot move back toward the hopper). This novel design enables the dispenser to use a simple "fish trap" design to reject bad cards. If the gift card inspector 24 determines that a card should be rejected because it was not properly programmed, or it cannot be properly read, the card slide 21 stops directly above the bad card bin 25. The transporter motor 18 then reverses direction, causing the card slide to reverse direction and move back toward the hopper. The bad card is prevented from moving with the card slide, and when the slide has moved out from under the card, the card falls into the bad card bin.

Figure 6:
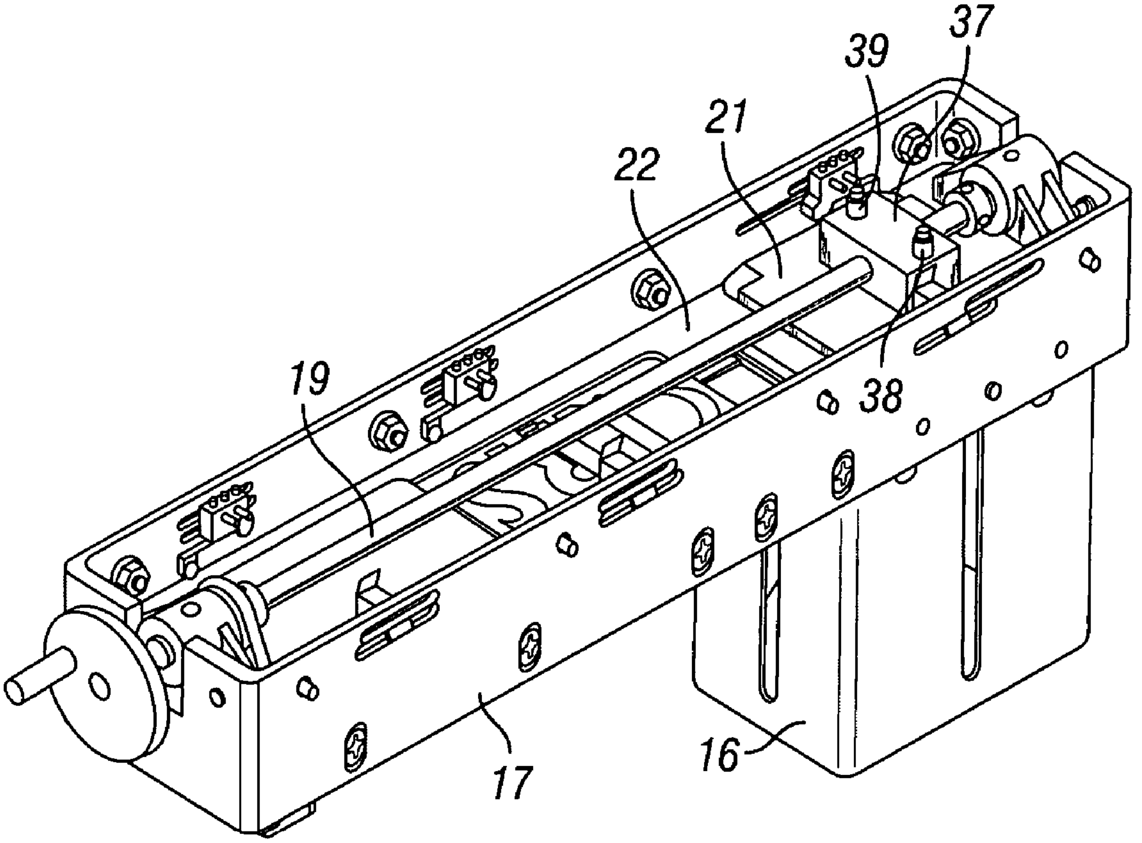
FIG. 6 is a bottom perspective view of the gift card transporter of FIG. 4.

FIG. 6 is a bottom perspective view of the gift card transporter 17 of FIG. 4. This view shows more detail of the mounting of the card slide 21 to the threaded slider 37, which moves longitudinally along the bottom of the track 22 when the transporter motor 18 rotates the threaded shaft 19. Two pins 38, 39 fit into the holes 34, 35 in the card slide, and secure it to the slider 37. By rotating the shaft in opposite directions, the card slide 21 moves longitudinally along the track in both a downstream direction (away from the hopper) and an upstream direction (toward the hopper). If a card becomes jammed in the track in a position between the card slide and the hopper, the transporter motor reverses directions, causing the card slide to move toward the hopper. The bevel 33 on the extension 31 enables the card slide to bypass the jammed card. The transporter motor then reverses again, causing the lip 32 of the card slide to catch the jammed card and clear it from the track.

Figure 7:
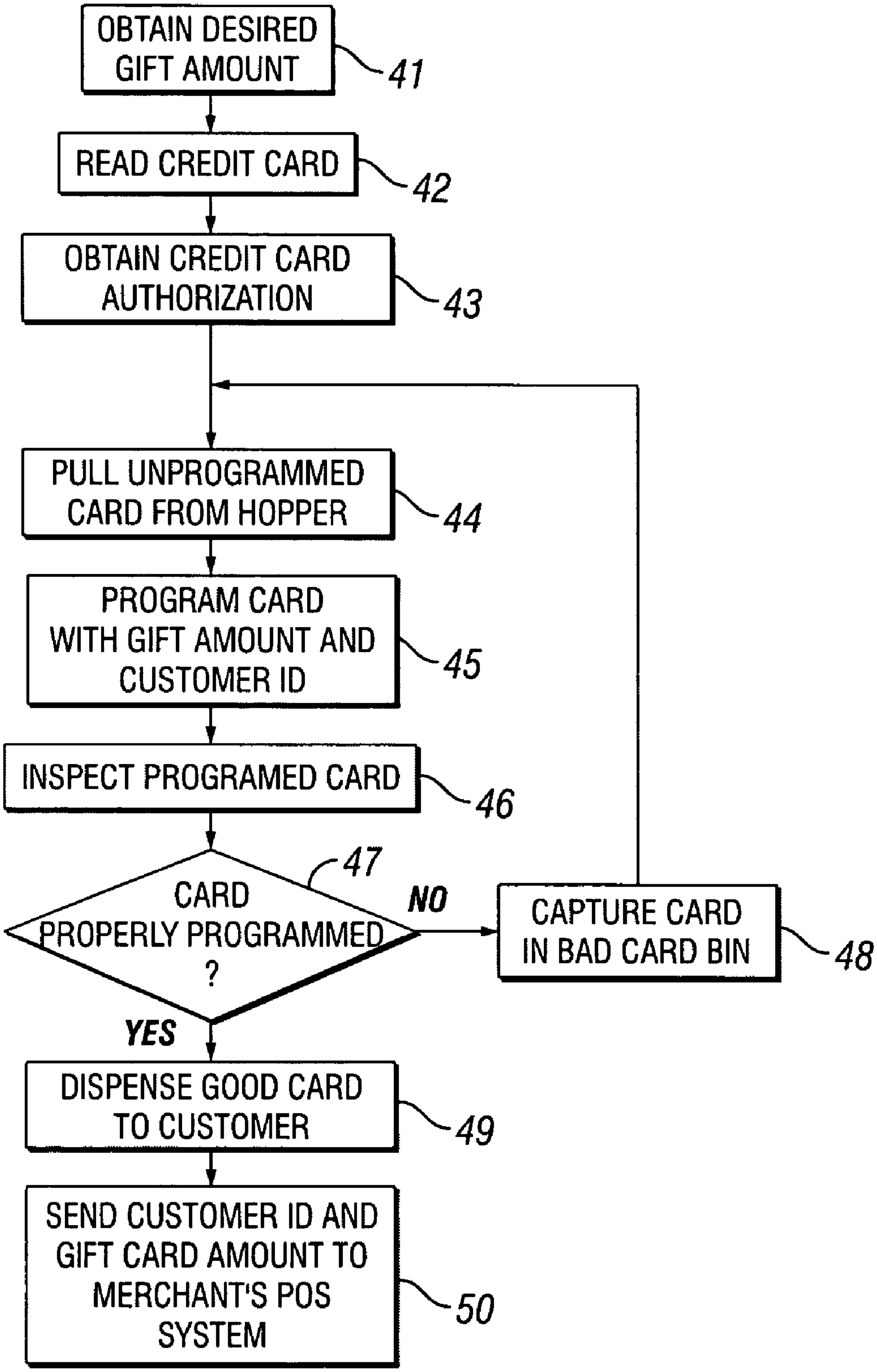
FIG. 7 is a flow chart illustrating the steps performed by the multi-function device in a first exemplary embodiment of a method of dispensing a gift card.

FIG. 7 is a flow chart illustrating the steps performed by the multi-function device 10 in a first exemplary embodiment of a method of dispensing a gift card. At step 41, the multi-function device obtains the desired gift card amount through the customer input pad 13*a*. At step 42, the credit card reader 14 reads the customer's credit card. At step 43, the controller 11 obtains authorization from the remote credit card authorization service 15. This may be done, for example, through a phone line or Internet connection. Alternatively, the merchant may already subscribe to an authorization service. In this case, the controller may send an authorization request to the merchant's POS system 27, which obtains approval from the authorization service and informs the controller. At step 44, an unprogrammed card is pulled from the card stock hopper 16. At step 45, the gift card programmer 23 programs the gift card with the gift amount and a customer identification. At step 46, the gift card inspector 24 inspects the programmed gift card, and at step 47, the inspector determines whether the gift card has been properly programmed. If not, the method moves to step 48 where the bad card is captured in the bad card bin 25, and the process returns to step 44 and pull another unprogrammed card from the hopper. However, if the card was properly programmed, the method moves to step 49 where the card is dispensed to the customer through the good card dispenser 26. At step 50, the controller then sends the customer identification and the gift card amount to the merchant's POS system where the information is registered.

Figure 8:
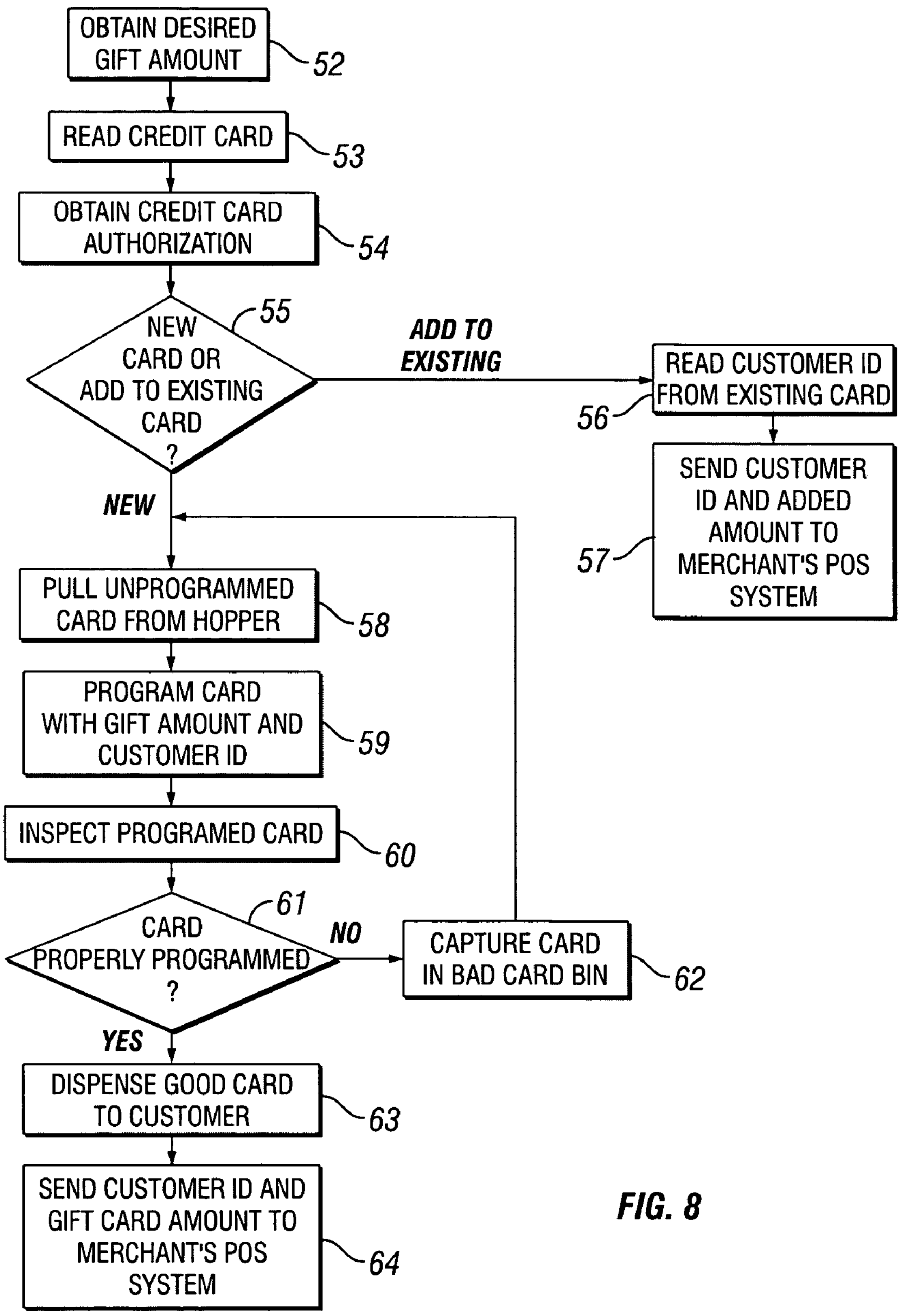
FIG. 8 is a flow chart illustrating the steps performed by the multi-function device in a second exemplary embodiment of a method of dispensing a gift card.

FIG. 8 is a flow chart illustrating the steps performed by the multi-function device 10 in a second exemplary embodiment of a method of dispensing a gift card. This embodiment provides the customer with the ability to add more money to an existing gift card or purchase a new gift card. At step 52, the multi-function device obtains the desired gift card amount through the customer input pad 13*a*. At step 53, the credit card reader 14 reads the customer's credit card. At step 54, the controller 11 obtains authorization from the remote credit card authorization service 15. At step 55, it is determined from the customer, whether the customer desires to purchase a new gift card or add money to an existing gift card. If the customer indicates that she wishes to add to an existing gift card, the method moves to step 56 where the customer identification is read from the existing card or the customer enters her identification through the customer input pad. At step 57, the customer identification and the added amount of the gift card are sent to the merchant's POS system 15 where the information is registered.

However, if the customer indicates at step 55 that she wishes to purchase a new gift card, the method moves to step 58 where an unprogrammed card is pulled from the card stock hopper 16. At step 59, the gift card programmer 23 programs the gift card with the gift amount and a customer identification. At step 60, the gift card inspector 24 inspects the programmed gift card, and at step 61, the inspector determines whether the gift card has been properly programmed. If not, the method moves to step 62 where the bad card is captured in the bad card bin 25. However, if the card was properly programmed, the method moves to step 63 where the card is dispensed to the customer through the good card dispenser 26. At step 64, the controller then sends the customer identification and the gift card amount to the merchant's POS system where the information is registered.

Figure 9:
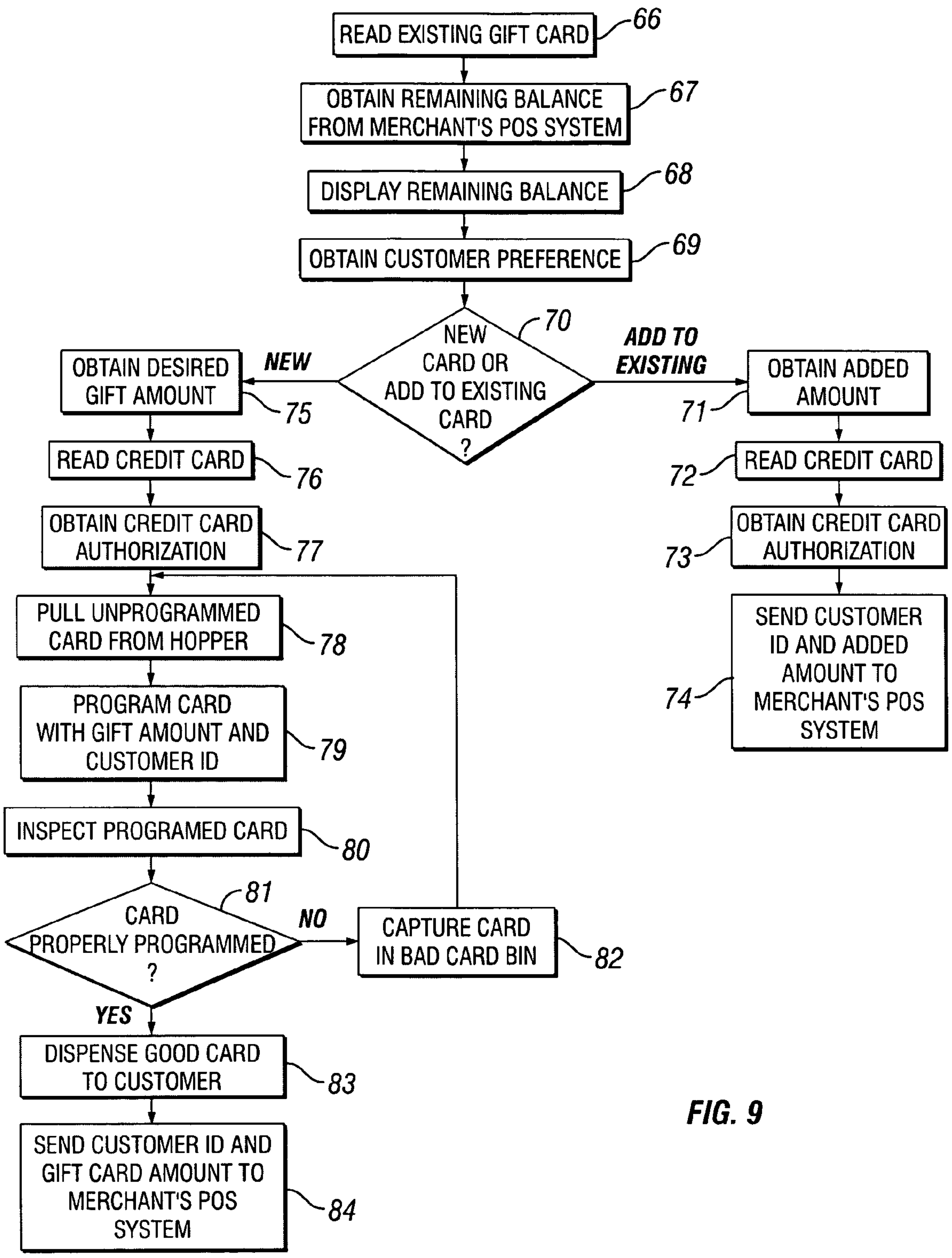
FIG. 9 is a flow chart illustrating the steps performed by the multi-function device in a third exemplary embodiment of a method of dispensing a gift card.

FIG. 9 is a flow chart illustrating the steps performed by the multi-function device 10 in a third exemplary embodiment of a method of dispensing a gift card. This embodiment provides the customer with the ability to check the remaining balance on an existing gift card prior to deciding whether to add more money to an existing gift card or purchase a new gift card. At step 66, the multi-function device reads the existing gift card. At step 67, if the gift card does not have the remaining balance programmed on the card, the device uses the customer identification from the card to obtain the remaining balance from the merchant's POS system 15. At step 68, the device then displays the remaining balance to the customer on the display 12. At step 69, the dispenser obtains the customer's preference through the customer input pad 13*a*. At step 70, it is determined whether the customer desires to purchase a new gift card or add money to an existing gift card. If the customer has indicated that she wishes to add to an existing gift card, the method moves to step 71 where the added amount is obtained through the customer input pad. At step 72, the credit card reader 14 reads the customer's credit card. At step 73, the controller 11 obtains authorization from the remote credit card authorization service 15. At step 74, the customer identification and the added amount of the gift card are sent to the merchant's POS system 15 where the information is registered.

However, if it is determined at step 70 that the customer desires to purchase a new gift card, the method moves to step 75 where the multi-function device obtains the desired gift card amount through the customer input pad 13*a*. At step 76, the credit card reader 14 reads the customer's credit card. At step 77, the controller 11 obtains authorization from the remote credit card authorization service 15. At step 78, an unprogrammed card is pulled from the card stock hopper 16. At step 79, the gift card programmer 23 programs the gift card with the gift amount and a customer identification. At step 80, the gift card inspector 24 inspects the programmed gift card, and at step 81, the inspector determines whether the gift card has been properly programmed. If not, the method moves to step 82 where the bad card is captured in the bad card bin 25. However, if the card was properly programmed, the method moves to step 83 where the card is dispensed to the customer through the good card dispenser 26. At step 84, the controller then sends the customer identification and the gift card amount to the merchant's POS system where the information is registered.

Figure 10:
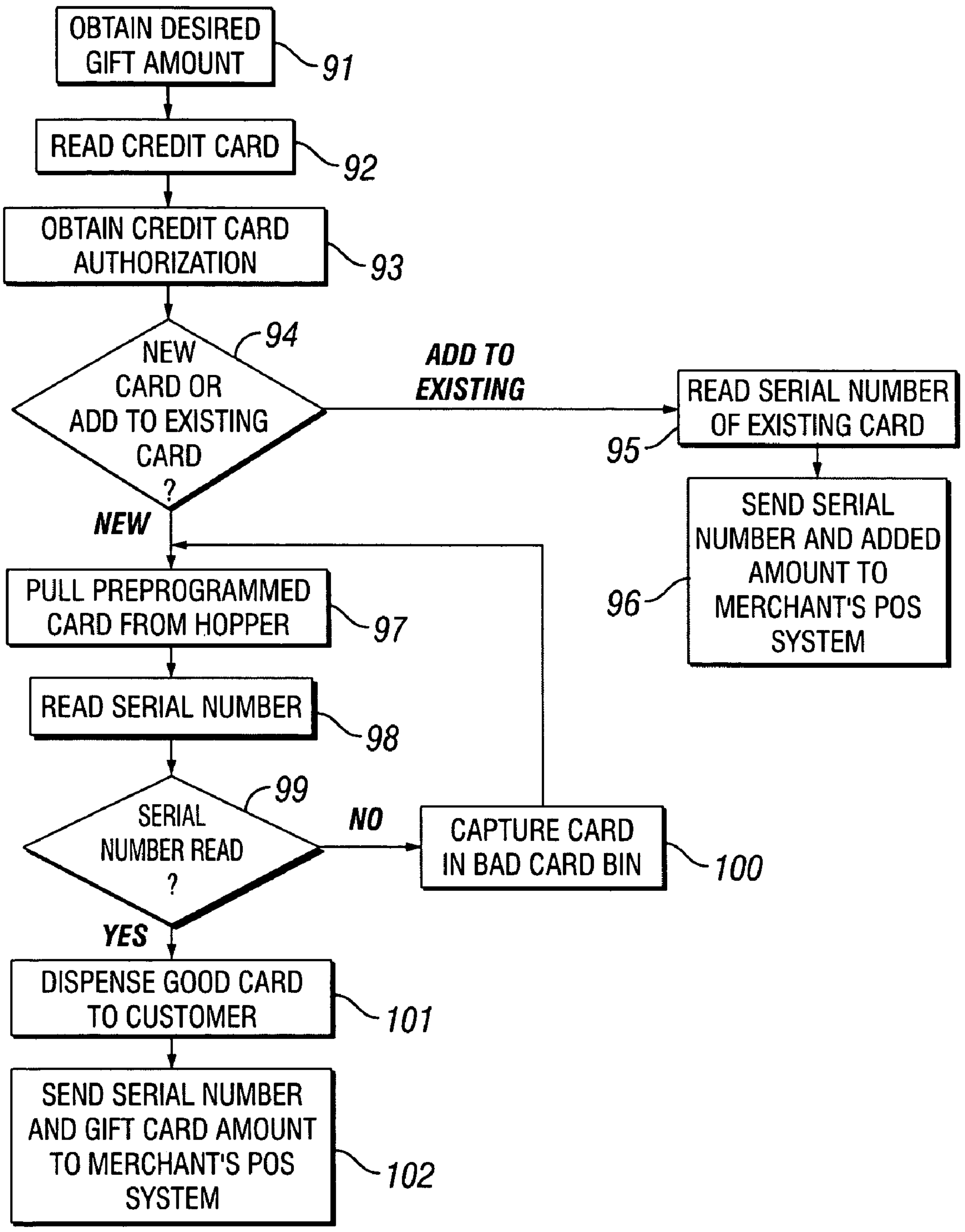
FIG. 10 is a flow chart illustrating the steps performed by the multi-function device in a fourth exemplary embodiment of a method of dispensing a gift card.

FIG. 10 is a flow chart illustrating the steps performed by the multi-function device 10 in a fourth exemplary embodiment of a method of dispensing a gift card. In this embodiment, the multi-function device 10 does not program the gift card at all. Instead, each of the cards is preprogrammed with a serial number. The gift card inspector 24 reads the preprogrammed serial number, and the controller 11 passes the serial number to the merchant's POS system 27 where the number is registered as having the value purchased by the customer. If the gift card inspector cannot read the preprogrammed serial number, the card is discarded in the bad card bin 25.

Thus, at step 91, the multi-function device obtains the desired gift card amount through the customer input pad 13*a*. At step 92, the credit card reader 14 reads the customer's credit card. At step 93, the controller 11 obtains authorization from the remote credit card authorization service 15. At step 94, it is determined from the customer, whether the customer desires to purchase a new gift card or add money to an existing gift card. If the customer indicates that she wishes to add to an existing gift card, the method moves to step 95 where the serial number of the customer's existing gift card is read from the existing card. At step 96, the serial number and the added amount of the gift card are sent to the merchant's POS system 15 where the information is registered.

However, if the customer indicates at step 94 that she wishes to purchase a new gift card, the method moves to step 97 where a preprogrammed card is pulled from the card stock hopper 16. At step 98, the gift card inspector 24 reads the serial number from the gift card, and at step 99, determines whether the serial number could be properly read. If not, the method moves to step 100 where the bad card is captured in the bad card bin 25. However, if the serial number was properly read, the method moves to step 101 where the card is dispensed to the customer through the good card dispenser 26. At step 102, the controller then sends the serial number and the gift card amount to the merchant's POS system where the information is registered.

When the card being issued is a loyalty card, there is generally no payment made for the card. Instead, the customer enters predefined personal information through the keyboard 13*b*. Certain personal information may be required while other information is optional. If the required information is received, the device associates the information with a unique loyalty card, and the device dispenses the unique loyalty card. The merchant may have a loyalty program in which customer purchases are rewarded with points that are redeemable for cash, merchandise, or discounts on future purchases. The loyalty card includes an identifier for the customer such as encoded information on a magnetic strip or bar code. A customer with a previously issued loyalty card may scan her card through the magnetic card reader 14 or similar optical scanner, and the device displays the number of accumulated points on the display 12.

Figure 11:
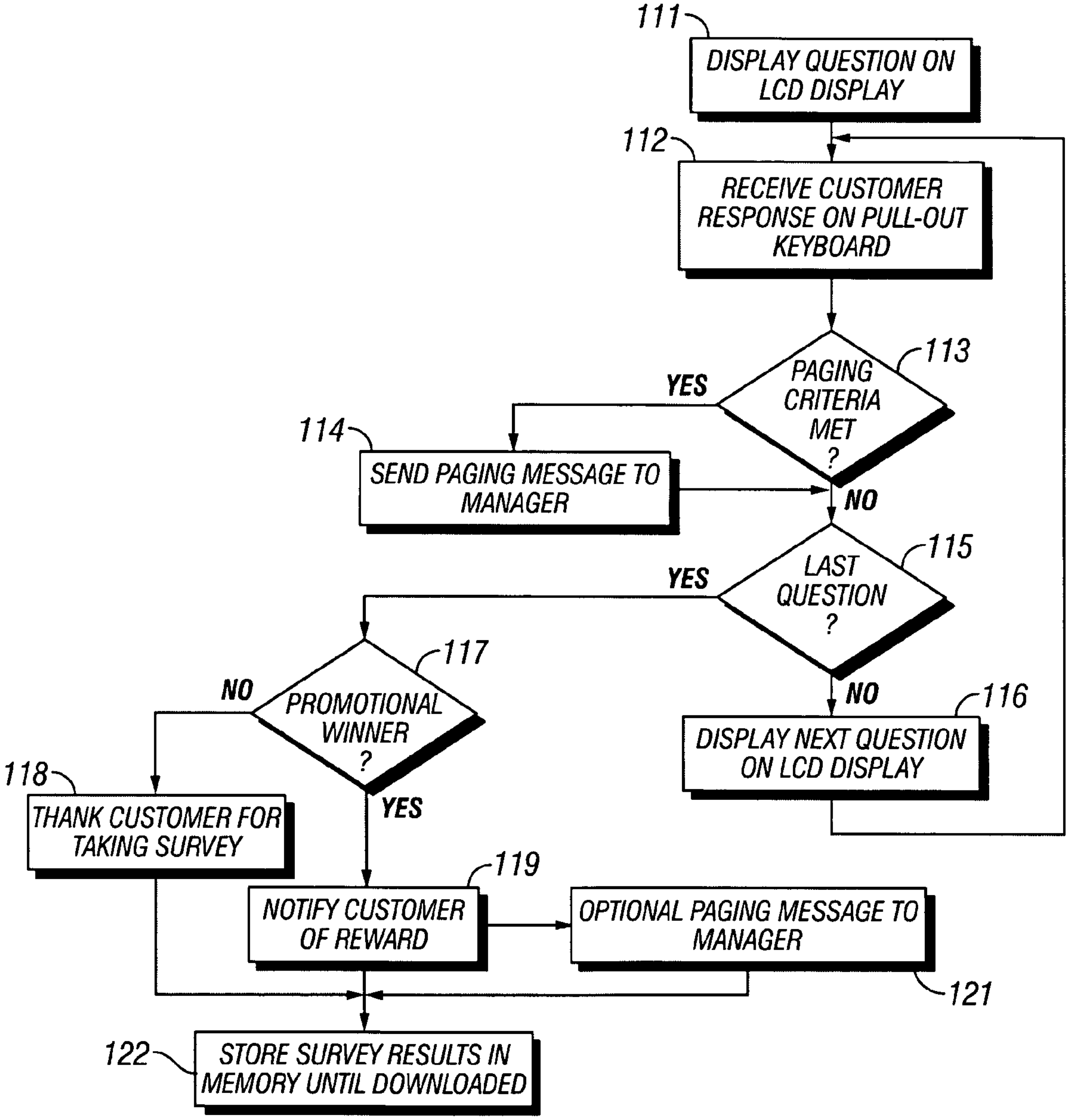
FIG. 11 is a flow chart illustrating the steps performed by the multi-function device in an exemplary embodiment of a method of collecting customer survey information.

FIG. 11 is a flow chart illustrating the steps performed by the multi-function device 10 in an exemplary embodiment of a method of collecting customer survey information. At step 111, the multi-function device displays the first survey question on the LCD display 21 or in the separate question displays 29. At step 112, a customer response is received through the pull-out keyboard 13*b* or alternatively, through the keypad 13*a*. At step 113, it is determined whether or not the customer's response matches predetermined criteria for paging the manager. For example, if the customer's choices are BEST, GOOD, FAIR, and POOR, and the customer enters BEST or POOR, the process may move to step 114 where the tray transmits a paging message to alert the establishment manager that the customer reported particularly good or bad service. At step 115, it is determined whether the question was the last survey question. If not, the next question is then displayed at step 116. The process then returns to step 112 and awaits the customer's response.

If it is determined at step 115 that the question was the last survey question, the process moves to step 117 where the multi-function device may optionally determine whether or not the customer is a winner in a promotional program designed to provide the customer with incentive to return to the merchant's establishment. Winners may be determined at random or at an interval set by the merchant (for example, every tenth customer). If the customer is not a winner, the customer is thanked at step 118 for taking the survey. If the customer is a winner, the customer is notified of the reward at step 119. Optionally, the device may page the manager at step 121 so that the manager can congratulate the customer and/or bring the customer a reward certificate. At step 122, the device stores the survey results in the memory 4 until the customer information is downloaded for analysis or further action.

The multi-function device 10 may also be used to collect customer information in addition to survey results. For example, the device may collect e-mail addresses for use in future direct-marketing campaigns. General comments about the retail establishment may also be collected and compiled for management attention.

It should be noted that any customer information entered into the device does not remain resident on the device. The device serves as a portal for this information, but for security reasons, the information is transmitted from the device through, for example, the LAN connection 1 or the modem connection 3 to a backend server or PC 2 (FIG. 1) where the information is securely stored.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A computer-controlled, multi-function device for generating and dispensing a gift card to a customer and for collecting customer survey information, said gift card having a financial value for purchasing goods and/or services from an associated merchant, said device comprising:

payment input means for receiving payment for the gift card from the customer;

dispensing means for dispensing the gift card to the customer in response to receiving the payment;

electronic means for obtaining and storing customer survey information, the electronic means including:

means for presenting to the customer a plurality of survey questions; and means for obtaining customer responses to the survey questions; and paging means for sending a page to a manager if a customer response indicates a level of satisfaction above a first threshold or below a second threshold.

2. The device according to claim 1, wherein the payment input means includes a magnetic strip reader for reading identifying information from a card selected from a group consisting of a credit card, a debit card, a loyalty card, and a club card.

3. The device according to claim 1, wherein the dispensing means includes:

inspecting means for determining whether a gift card that is preprogrammed with an identifier can be properly read;

disposing means in communication with the inspecting means for disposing of the gift card if the inspecting means cannot properly read the identifier; and dispensing means in communication with the inspecting means for dispensing the gift card to the customer if the inspecting means can properly read the identifier.

4. The device according to claim 1, further comprising printing means for printing a thank-you note thanking the customer for taking the survey.

5. The device according to claim 1, further comprising printing means for printing as a reward for taking the survey, a discount coupon for goods or services provided by the merchant.

6. The device according to claim 1, further comprising means for providing the customer with a discount on a gift card as a reward for taking the survey.

7. The device according to claim 1, further comprising interfacing means for interfacing the device with an external server for uploading survey questions to the device and downloading customer responses from the device.

8. The device according to claim 1, wherein the electronic means for obtaining and storing customer information includes means for obtaining customer contact information, said contact information being selected from a group consisting of an electronic mail (e-mail) address, a mailing address, and a telephone number.

9. The device according to claim 8, further comprising interfacing means for interfacing the device with an external server for generation of customer correspondence.

10. A computer-controlled, multi-function device for generating and dispensing a gift certificate and for collecting customer information, said gift certificate having a financial value for purchasing goods and/or services from an associated merchant, said device comprising:

payment input means for receiving payment for the gift certificate from the customer;

printing means for printing the gift certificate and dispensing the gift certificate to the customer in response to receiving the payment;

electronic means for obtaining and storing customer survey information; and paging means for sending a page to a manager if a customer response to a survey question indicates a level of satisfaction above a first threshold or below a second threshold.

11. A computer-controlled device for generating and dispensing a retail card to a customer, said device comprising:

input means for receiving predefined information from the customer;

means for associating the received predefined information with a unique retail card;

dispensing means for dispensing the unique retail card to the customer in response to receiving the predefined information;

electronic means for obtaining customer survey information; and paging means for sending a page to a manager if a customer response to a survey question indicates a level of satisfaction above a first threshold or below a second threshold.

12. The device according to claim 11, wherein the retail card is selected from a group consisting of a gift card, a loyalty card, a prepaid phone card, and a prepaid shopping card.

13. The device according to claim 11, further comprising means for interfacing the device with an external server for storing personal customer information.

14. A computer-controlled method of generating and dispensing a retail card to a customer, said method comprising:

providing a multi-function device in a location in the retail establishment accessible by a customer;

receiving through the device, predefined information from the customer;

associating the received predefined information with a unique retail card;

dispensing by the multi-function device, the unique retail card to the customer in response to receiving the predefined information;

obtaining customer survey information through the multi-function device; and sending a page to a manager if a customer response to a survey question indicates a level of satisfaction above a first threshold or below a second threshold.

15. The method according to claim 14, further comprising interfacing the device with an external server for storing personal customer information.

16. The method according to claim 15, wherein the step of interfacing the device with an external server includes sending customer contact information to the server, said contact information being selected from a group consisting of an electronic mail (e-mail) address, a mailing address, and a telephone number.

* * * * *